(12) United States Patent
Solomon et al.

(10) Patent No.: US 11,390,755 B2
(45) Date of Patent: Jul. 19, 2022

(54) PIGMENT GRANULATION PROCESS AND METHOD OF USE FOR COLORING BUILDING MATERIALS

(71) Applicant: Solomon Colors, Inc., Springfield, IL (US)

(72) Inventors: Adam Solomon, Springfield, IL (US); John Ciente, Springfield, IL (US)

(*) Notice: Subject to any disclaimer, the term of this patent is extended or adjusted under 35 U.S.C. 154(b) by 986 days.

(21) Appl. No.: 15/881,365

(22) Filed: Jan. 26, 2018

(65) Prior Publication Data

US 2018/0273765 A1    Sep. 27, 2018

Related U.S. Application Data

(60) Provisional application No. 62/450,869, filed on Jan. 26, 2017.

(51) Int. Cl.
| | | |
|---|---|---|
| C09C 3/04 | (2006.01) | |
| C09D 17/00 | (2006.01) | |
| C09C 1/24 | (2006.01) | |
| C04B 18/02 | (2006.01) | |
| B01J 2/00 | (2006.01) | |
| C04B 103/54 | (2006.01) | |

(52) U.S. Cl.
CPC ............ *C09C 3/045* (2013.01); *C04B 18/021* (2013.01); *C04B 18/022* (2013.01); *C09C 1/24* (2013.01); *C09C 3/043* (2013.01); *C09D 17/007* (2013.01); *B01J 2/00* (2013.01); *C01P 2004/32* (2013.01); *C01P 2004/60* (2013.01); *C04B 2103/54* (2013.01)

(58) Field of Classification Search
CPC ........... B30B 5/04; C09D 17/007; C09C 1/24; C09C 3/045; C09C 3/043; C04B 18/021; C04B 18/022; C04B 2103/54; C01P 2004/32; C01P 2004/60
See application file for complete search history.

(56) References Cited

U.S. PATENT DOCUMENTS

| | | | |
|---|---|---|---|
| 4,277,288 A | | 7/1981 | Lawrence et al. |
| 4,946,505 A | | 8/1990 | Jungk |
| 5,176,751 A | * | 1/1993 | Findley ................. C08K 3/013 106/502 |
| 5,480,626 A | * | 1/1996 | Klasen ................. B01J 37/0009 423/449.1 |
| 5,484,481 A | | 1/1996 | Linde et al. |
| 5,634,970 A | | 6/1997 | Linde et al. |
| 5,853,476 A | | 12/1998 | Will |

(Continued)

FOREIGN PATENT DOCUMENTS

EP          0598318 B1    5/1994

*Primary Examiner* — Pegah Parvini
(74) *Attorney, Agent, or Firm* — Polsinelli PC

(57) ABSTRACT

A pigment granule having an irregular polyhedral shape with rounded edges and a method for the production of the granules by the use of a high speed agitated granulating machine provided with agitating means for agitating a pigment substance for granulation, spray means for spraying or injecting a binding liquid on the pigment substance while the mixture is processed through the turbulizer and drying means for drying the particles, characterized by effecting the production by causing the means to act on the substance for granulation simultaneously thereby performing the agitating and granulation.

18 Claims, 8 Drawing Sheets

(56) References Cited

U.S. PATENT DOCUMENTS

| | | | |
|---|---|---|---|
| 7,351,474 B2* | 4/2008 | Etzrodt | C08J 3/212 |
| | | | 428/407 |
| 2004/0040469 A1 | 3/2004 | McAulay et al. | |
| 2008/0257213 A1* | 10/2008 | Friedrrich | C09C 1/24 |
| | | | 106/281.1 |
| 2010/0154680 A1 | 6/2010 | Friedrich et al. | |

* cited by examiner

PIGMENT GRANULATION PROCESS AND METHOD OF USE FOR COLORING BUILDING MATERIALS

CROSS REFERENCE TO RELATED APPLICATION

This application is related to and claims priority under 35 U.S.C. § 119(e) from U.S. Patent Application No. 62/450,869 entitled "PIGMENT GRANULATION PROCESS AND METHOD OF USE FOR COLORING BUILDING MATERIALS," which was filed Jan. 26, 2017 and is incorporated herein by reference in its entirety.

FIELD OF THE INVENTION

The present invention relates to a novel method for the production of pigment granules through the use of an agglomeration system. The system includes a high speed agitated granulating machine through the use of a horizontal flexible wall compactor provided with agitating means for granulation, spray or injection means for adding a liquid, a spray or injection means for spraying an additive on the mixture during production, disintegrating means for disintegrating particles arising from granulation, and drying means for drying the particles, characterized by effecting the production for granulation that can work sequentially or simultaneously to create the pigment granules. Further the granules are designed to be used for coloring building materials including but not limited to paving stones, retaining walls, ready-mixed concrete, pre-cast and wet-cast concrete and any other concrete and cementitious materials.

BACKGROUND

Metal oxides, such as iron oxides, chromium oxides, titanium dioxide and various mixed-metal oxides are used in the pigmentation of building materials, among other things, cement and concrete products (e.g. paving slabs and blocks). As well as can be used in many other products known in various industry. Such metal oxide pigments have traditionally been used in the form of a powder or have been processed to create a granulated pigment product.

Powdered metal oxide pigments, such as iron oxide, chromium oxide, titanium dioxide, and mixed-metal oxide pigments, are dusty, giving rise to health hazards and making storage and handling difficult. Also, the powders are not free flowing and so cannot readily be conveyed through pipes, which readily become blocked by the powder; furthermore the poor flowing properties of powders makes it hard to meter them using auger screws or vibratory trays/tubes to ensure the correct proportion of pigment to base material (e.g. concrete).

Because of the problem of storing, transporting, and processing of powdered solids this has led to the method and creation of novel granulated pigment products. The powdered substances have physical properties that differ from those of the granulated pigment products through the use of additives or other binders to such an extent that interactive forces are in effect at the surfaces between the individual powder particles in the molecular range. This then produces the granulated pigment products.

The production of granulated pigment products have been difficult to optimize and many options are currently available for the production of granulated pigment products. Overall a need continues to exist for an efficient system for the production of a granulated pigment product that can be readily used within the construction and building industries. What is desired are granules that need to be of sufficient shape and structure to allow for the packaging, transportation and use by a consumer without any loss in the efficient transfer of the pigment to be used in the building material. Examples of current technologies that have been used but still do not provide an optimum product for pigments include U.S. Pat. No. 5,059,250 (Burow et al.); U.S. Pat. No. 4,053,325 (Vanderheiden); U.S. Pat. No. 4,753,679 (Damiano et al.); U.S. Pat. No. 4,952,617 (Ayala et al.); and U.S. Pat. No. 4,946,505 (Jungk).

Additionally, current technologies for use in coloration of building materials, including concrete are U.S. Pat. No. 5,484,481 as well as U.S. Pat. No. 5,853,476 issued to Elementiso Pigments, Inc., which is to a process that uses a machine from Bepex MS that is a dry compactor to make granules for concrete coloration. The patent teaches the use of recycling of oversize and undersize material streams in a process that both creates enhanced color in the concrete and saves the cost of waste disposal.

Therefore it is an object of the present invention to demonstrate a process and ultimate product that are pigment granules that both readily disperse in the base medium and also are robust and have a reduced liability to dusting, i.e. to being broken down into powder. It is a further object of the present invention to provide a process for the creation of a near-polyhedral or irregular polyhedral shaped granule with rounded edges, such as creating a general spherical shape, that will be readily dispersible for use in the production of building materials and in particular concrete and cementitious materials.

SUMMARY

The purpose of this disclosure is to provide a method of producing a pigment granule composition and the resultant pigment granule composition. The pigment granule composition may include at least one pigment and at least one binder. The pigment granule composition may also include a pigment such as iron oxides, chromium oxides, titanium dioxides, cobalt blues, various other metal-oxides, carbon black, phthalocyanine green, phthalocyanine blue and combinations of the same. The pigment granule composition may include granules that have a near-polyhedral shape with round edges or irregular polyhedral shapes with rounded edges. The granule composition may have a moisture content of less than 2%. The granule composition may have granules that have a size passing through a 200 mesh sieve.

The granule composition may be produced by a method comprising the steps of adding an amount of a pigment to the granulation machine that includes a horizontal flexible wall compactor, adding an amount of water to the pigment such as iron oxide in the granulation machine, adding an amount of an additive to the granulation machine and activating the granulation machine to produce the pigment granule. In an embodiment, the method may include drying the composition to a moisture content less than 2%.

In another embodiment, the method may include adding a pigment or additional pigment such as iron oxides, chromium oxides, titanium dioxides, cobalt blues, various other metal-oxides, carbon black, phthalocyanine green, phthalocyanine blue and combinations of the same.

In another embodiment, the method may include adding a dispersant, a binder, or a combination of the same all dependent on the desired end product granule.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
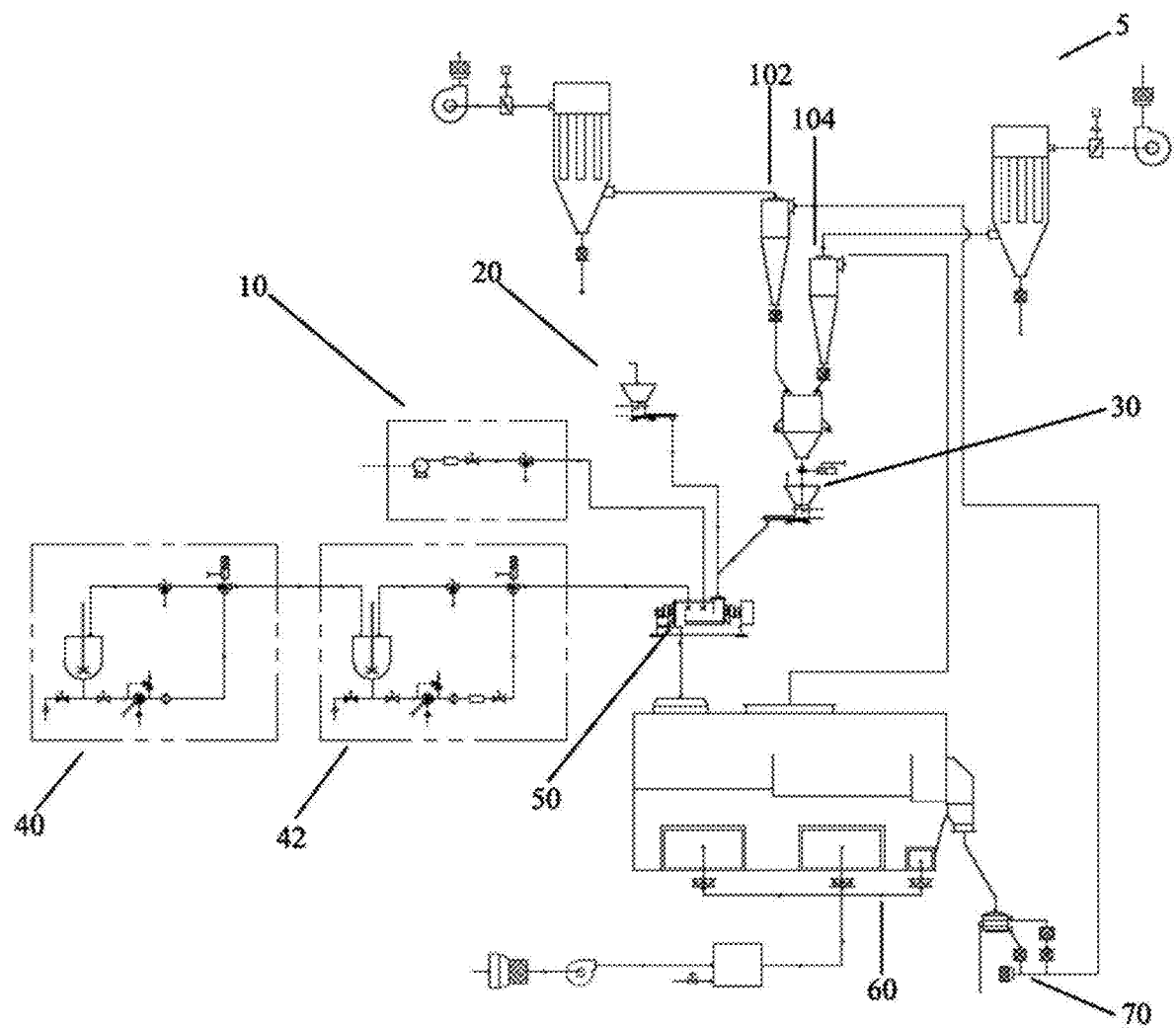
FIG. 1 is a diagram of one example of the granulation system and method of producing granulated pigments.
Figure 1A:
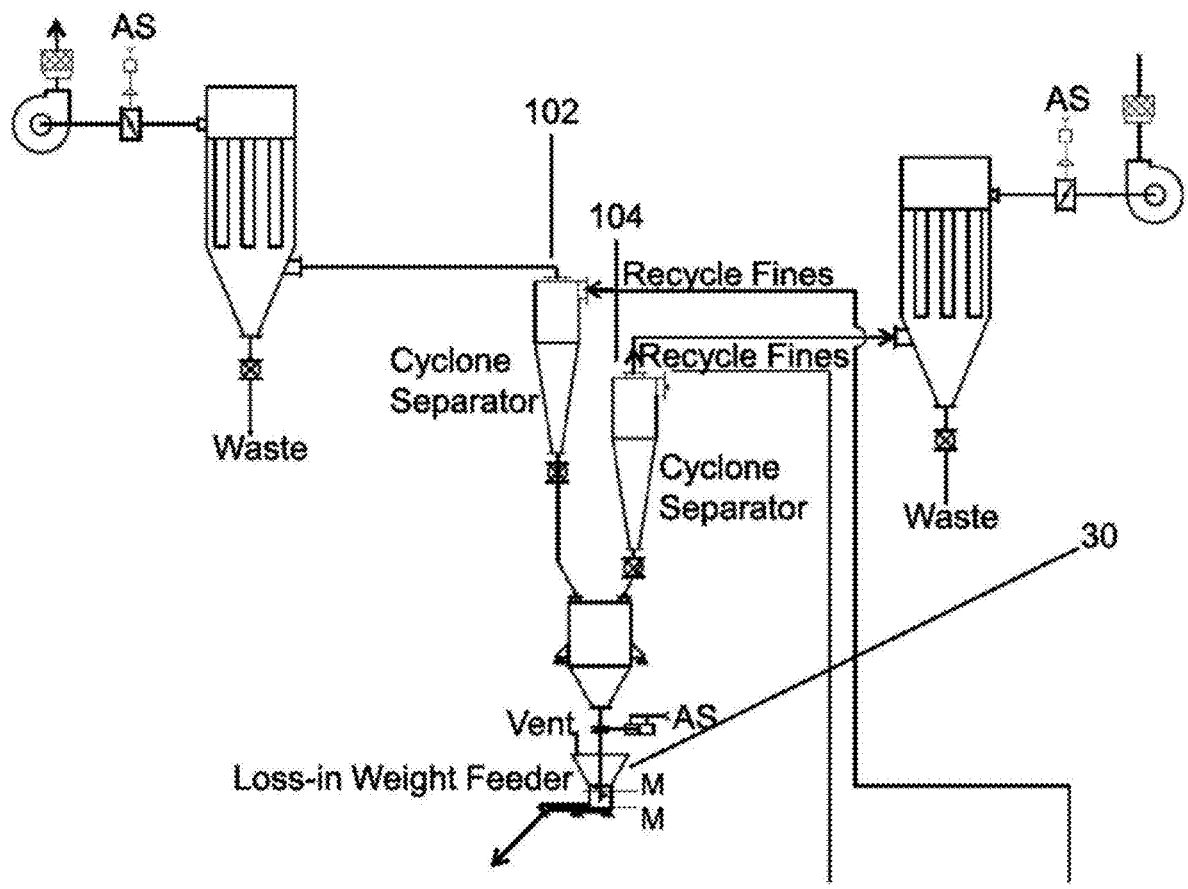
FIG. 1A is a diagram of one example of part of the granulation system and method of producing granulated pigments.
Figure 1B:
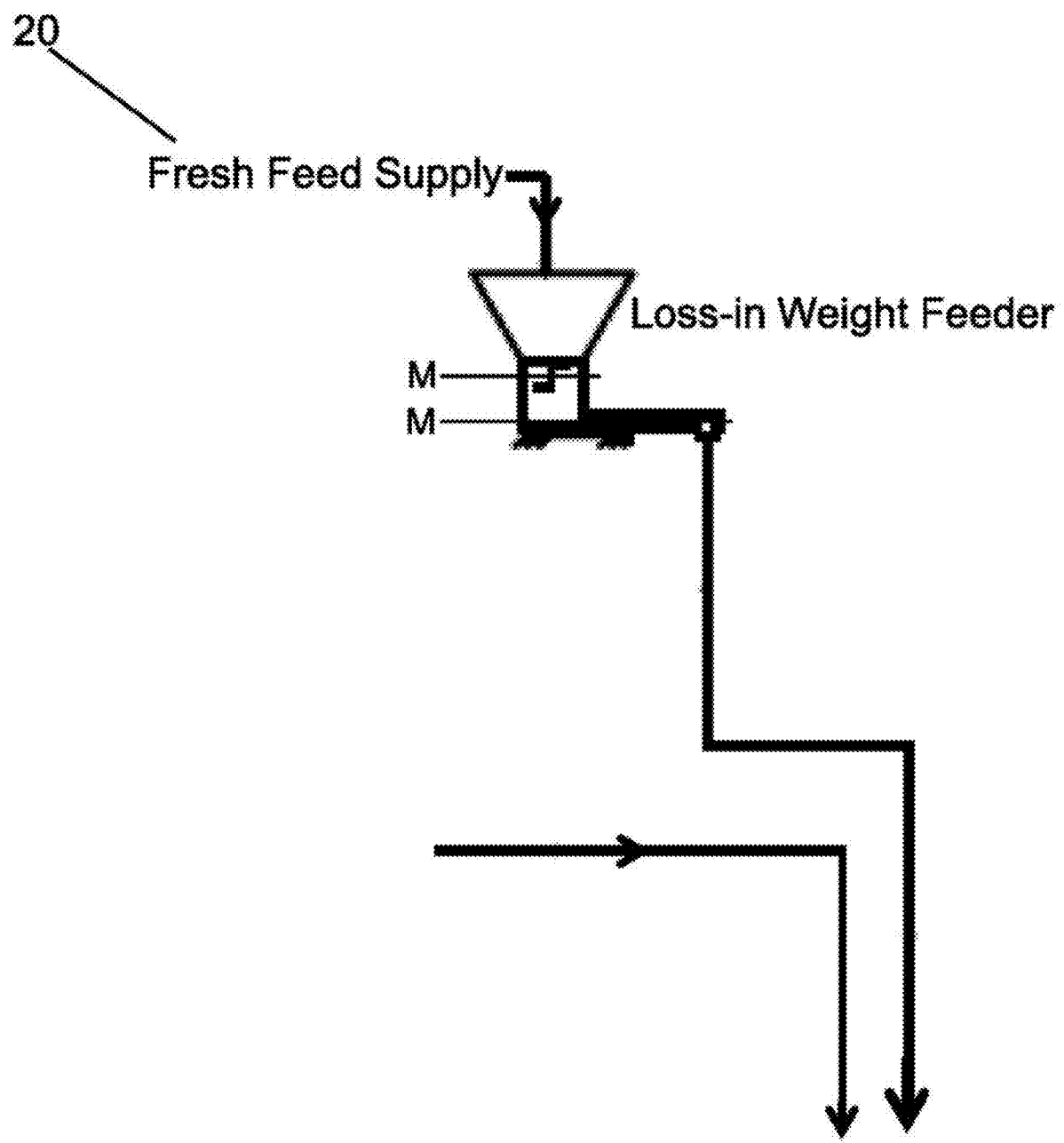
FIG. 1B is a diagram of one example of part of the granulation system and method of producing granulated pigments.
Figure 1C:
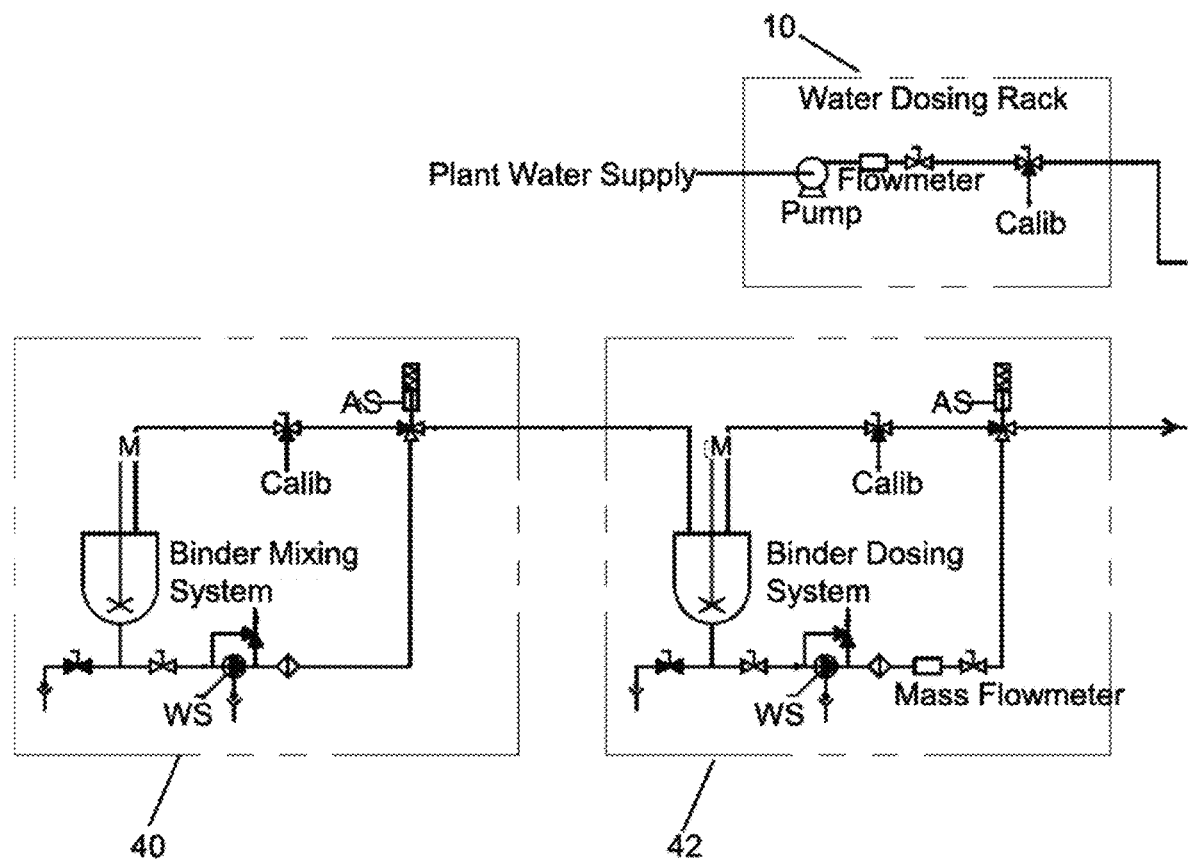
FIG. 1C is a diagram of one example of part of the granulation system and method of producing granulated pigments.
Figure 1D:
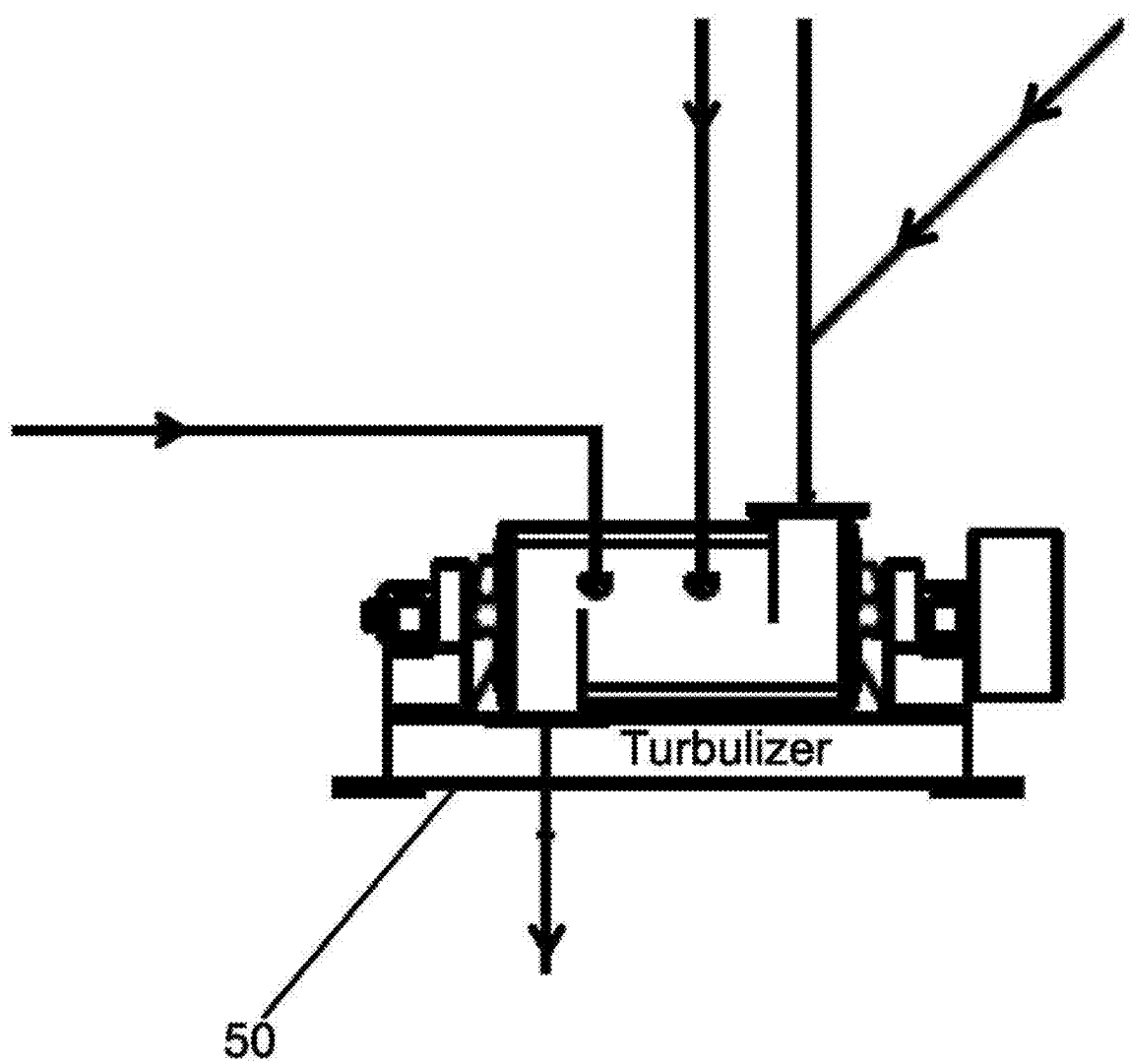
FIG. 1D is a diagram of one example of part of the granulation system and method of producing granulated pigments.
Figure 1E:
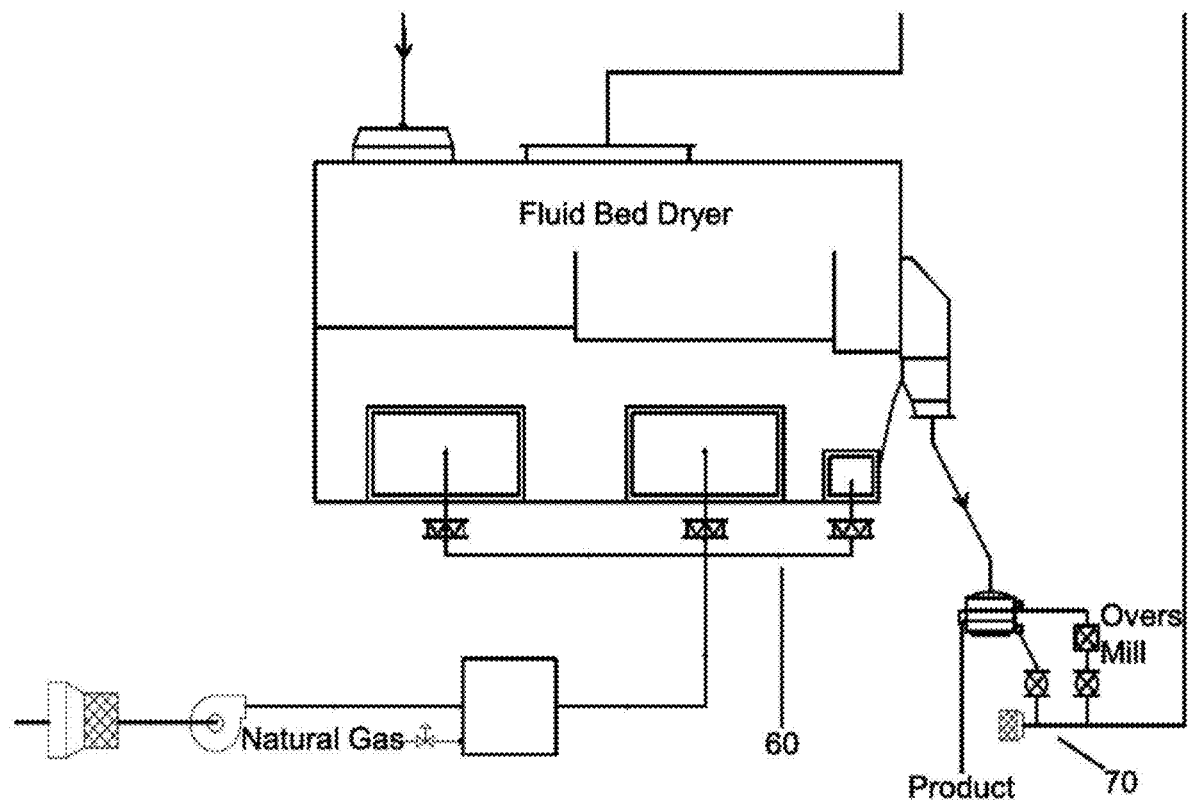
FIG. 1E is a diagram of one example of part of the granulation system and method of producing granulated pigments.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Figure 2:
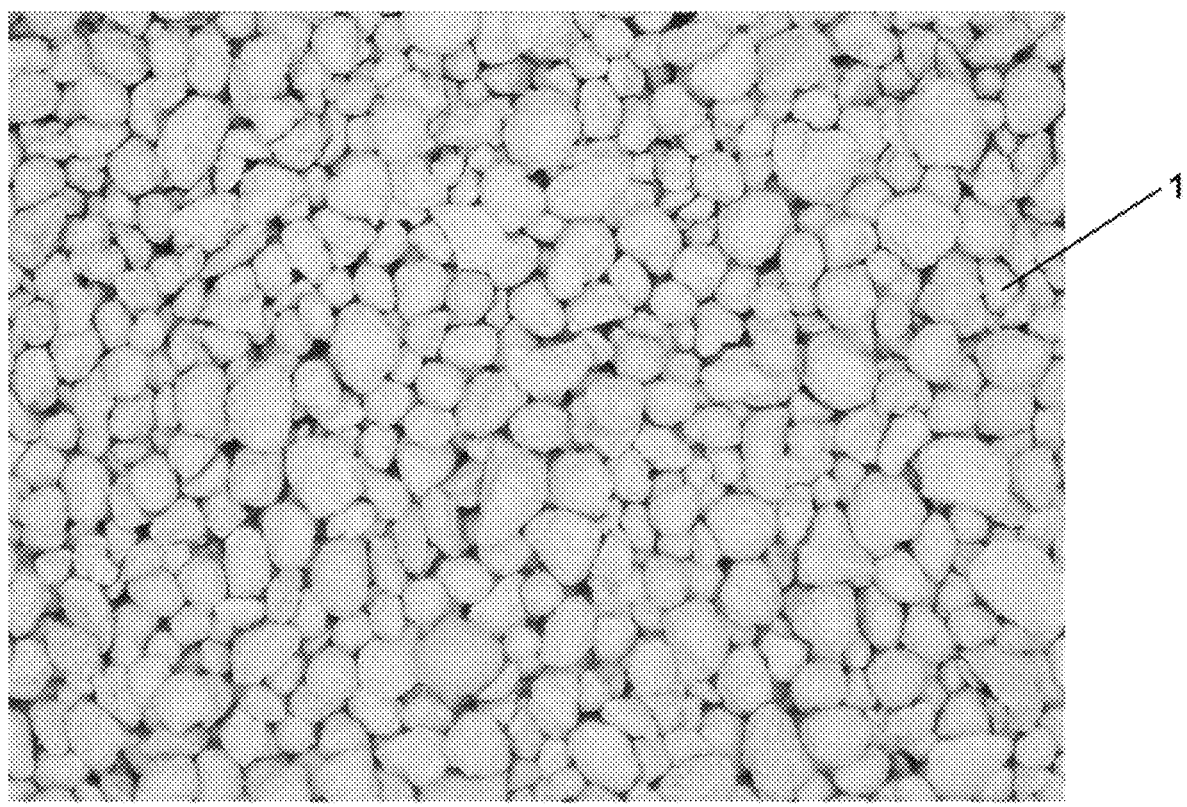
FIG. 2 is a micrograph that demonstrates the end product of the granule produced by the granulation system.
Figure 3:
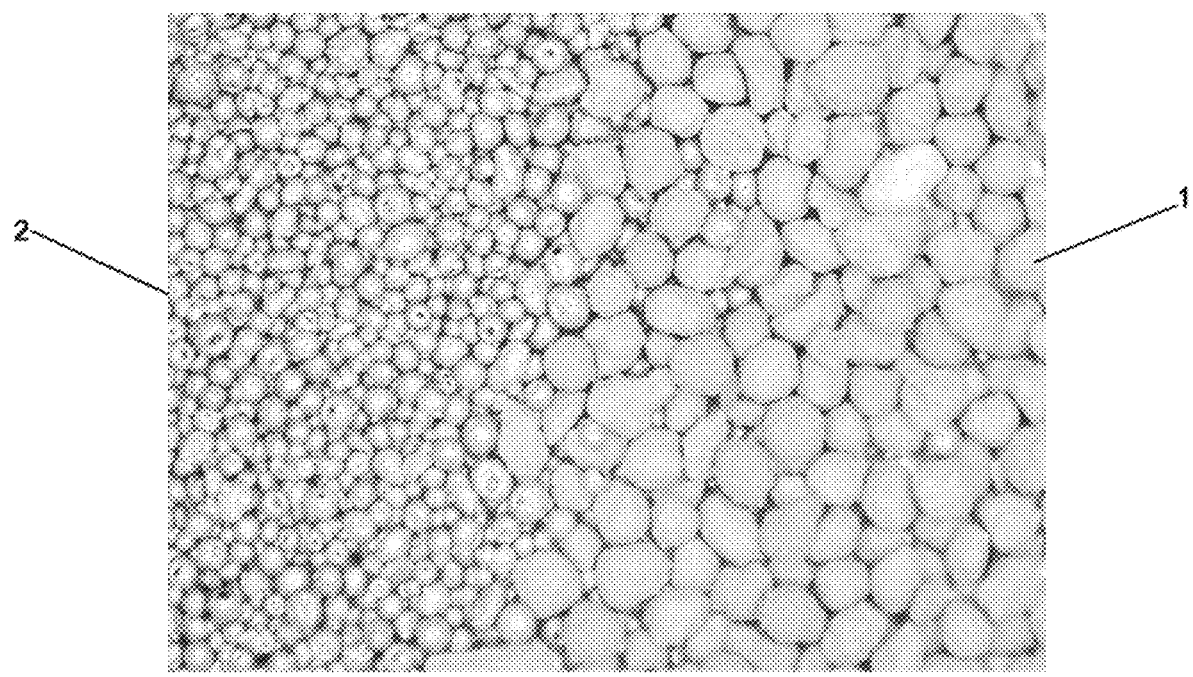
FIG. 3 is a micrograph that provides a comparison of granule end products from a spray dried methods versus the current granulation system.

It is to be understood that the disclosed embodiments are merely exemplary of the pigment granulation process and method of use for coloring building materials, which may be embodied in various forms. Therefore, specific structural and functional details disclosed herein are not to be interpreted as limiting, but merely as a basis for the claims and as a representative basis for teaching one skilled in the art to variously employ the present system in virtually any appropriately detailed structure The present invention is directed to the creation/production of readily dispersible pigment granules having a near-polyhedral shape with rounded edges and an agglomeration system for the production of free flowing granules for a desired pigment. FIGS. 1 through 3 illustrate various embodiments of a pigment granulation process the resultant product and method of use for coloring building materials. The granulation process may be achieved using a system 5 or a similar system. The system 5 may generally comprise a water source 10. The water source 10 may feed water into a turbulizer 50. Additionally, pigment may be fed into the turbulizer 50. The pigment may come from a virgin feed supply 20, from a recycled feed supply 102, 104, or combinations thereof. Binders may also be fed into the turbulizer 50 from one or more binder sources 40, 42. The binder sources 40, 42 may also be used to provide other additives such as dispersants. The system 5 may also include a dryer 60 for drying the pigment granules 1 once the granules 1 leave the turbulizer 50.

The pigment granules 1 may have a spherical shape. The pigment granules 1 may also have a near-polyhedral shape with rounded edges. As shown in FIG. 2, the granules 1 may have an irregular polyhedral shape with rounded edges. The number of faces found on each granule may vary. One of skill in the art will appreciate that the granules created are a polyhedral 3-dimensional shape with multiple sides. The number of non-limiting sides may include 3, 4, 5, 6, 7, 8, 9, or 10 sides. The granules may also have more than 10 sides. The granules may have a size that allows the granules to be readily dispersible in an appropriate medium. In general, the granules may have diameters that range from 0.001 to 5 mm. In various embodiments, the granules may have diameters of about 0.001 mm, about 0.005 mm, about 0.01 mm, about 0.05 mm, about 0.1 mm, about 0.5 mm, about 1.0 mm, about 1.5 mm, about 2.0 mm, about 2.5 mm, about 3.0 mm, about 3.5 mm, about 4.0 mm, about 4.5 mm, or about 5.0 mm. The Table 1 shows an exemplary size distribution of the granules 1. One of skill in the art will appreciate that the granules may have any size distribution know in the art.

TABLE 1

| Sieve | Percentage |
| --- | --- |
| 40 mesh | 30-60% |
| 60 mesh | 10-40% |
| 80 mesh | 5-25% |
| 100 mesh | 0-25% |
| 200 mesh | 0-20% |
| PAN | 0-5% |

The process incorporates high speed granulation that uses equipment designed to allow for the process to be less expensive and demand less energy consumption when compared to conventional manufacturing methods, such as spray drying, ball millings, pan granulation and other known industry practices. The method for high speed agitated granulation according to this invention is a method for wet production of granules by the use of a high speed agitated granulating machine that incorporates the use of a pin mixer, turbulizer or a horizontal flexible wall compactor which is provided with agitating means for rolling and agitating a substance for granulation, spray or injection means for spraying or injection of a liquid such as water and further spraying or injection of a binding liquid on the substance, disintegrating means for disintegrating particles arising from granulation, and drying means for drying these particles. The method produces pigment granules that have size and shape that make the granules readily dispersible in a base medium such as a cementitious medium.

The agglomeration system and process comprises mixing at least one pigment with an amount of water and a binder or dispersant to form a mixture. The process can include pigments that are known in the construction industry that include but are not limited to iron oxides, chromium oxides, titanium dioxides, cobalt blues, various other metal-oxides, carbon black, phthalocyanine green, phthalocyanine blue and combinations of the same. The process can include a single pigment or can be a combination of pigments that include one, two, three, four, five, six, or more pigments to create a pigment blend. The number and ratio of different pigments added will be dependent on the desired end product. The pigment is added to the turbulizer (or granulator) 50 which is a pin mill type piece of equipment. In other variations the pin mill type equipment is a horizontal flexible wall compactor designed to create the granulated pigment. The pigment can be added to the turbulizer 50 in a single pigment stream, in a single stream with a pigment blend, with multiple single pigment streams, or with multiple pigment blend streams. The pigment source may be a virgin feed supply 20 or may come from a recycled source 102, 104. The amount of pigment added to the turbulizer will depend on the desired granulated pigment end products. In an additional embodiment virgin pigments can be blended with recycled pigments to form the desired pigment blend. The combination of virgin and recycled pigments allows for a more efficient and cost effective system to create the desired granulated pigment end products. As a non-limiting example, recycled pigment may be obtained from a fluid bed dryer 60, and fed to a recovery system 102, 104. Recycled pigment may also be obtained from an overs mill 70. One of skill in the art will appreciate that the recycled pigment may be fed into the turbulizer 50 using any source known in the art.

The amount of virgin pigment used can between 0% and 100%. The amount of recycled pigments used can between 0% and 100%. The percentage ratio of the virgin pigment to recycled pigment will be dependent on the desired granulated pigment end product. The amount of virgin pigment in the composition may vary. In general, the weight percent of virgin pigment to the total composition may range from 0% to 100% (w/w). In various embodiments, the weight percent of virgin pigment to the total composition may be about 15%, about 20%, about 25%, about 30%, about 35%, about 40%, about 45%, about 50%, about 60%, about 65%, about 70%, about 75%, about 80%, about 85%, about 90%, about 95%, or about 99% (w/w). In exemplary embodiments, the weight percent of virgin pigment in the total composition may range from about 40% to about 100% (w/w).

In general, the weight percent of recycled pigment to the total composition may range from 0.00% to 98% (w/w). In various embodiments, the weight percent of recycled pigment to the total composition may be about 0%, about 5%, about 10%, about 15%, about 20%, about 25%, about 30%, about 35%, about 40%, about 45%, about 50%, about 60%, about 65%, about 70%, about 75%, about 80%, about 85%, or about 90% (w/w). In exemplary embodiments, the weight percent of recycled pigment in the total composition may range from about 40% to about 100% (w/w).

In general, the total weight percent of both virgin and recycled pigment to the total composition may range from 0.00% to 98% (w/w). In various embodiments, the total weight percent of both virgin and recycled pigment to the total composition may be about 0%, about 5%, about 10%, about 15%, about 20%, about 25%, about 30%, about 35%, about 40%, about 45%, about 50%, about 60%, about 65%, about 70%, about 75%, about 80%, about 85%, or about 90% (w/w). In exemplary embodiments, the total weight percent of both virgin and recycled pigment in the total composition may range from about 40% to about 100% (w/w). In other exemplary embodiments, the total weight percent of both virgin and recycled pigment in the total composition may be about 87% (w/w).

In addition to the pigment being added to the turbulizer an amount of a liquid such as water is added to the turbulizer 50. The water or other suitable liquid or additive in a liquid form is injected simultaneously with the pigment into the turbulizer 50. The amount of water or other suitable liquid may cause the composition to be moist. In embodiments where the surfactant or dispersants are in the liquid form, the liquid surfactant or dispersant may contribute to the moisture content of the composition. The liquid may be sourced from an appropriate liquid source 10. The liquid source 10 may be a water dosing rack that pumps water from a water supply into the turbulizer 50. Water or other suitable liquids added to the turbulizer 50 may result in a mixture which has a moisture content in the range of 1% to 30% by weight relative to the pigment. In one embodiment the moisture content will between 10% and 20%. This range will depend on the desired granulated pigment end product. The amount of liquid such as water added must remain at a minimum to ensure the mixture remains a damp powder or moist powder and does not become a paste. In one embodiment the water and pigment will be added to the turbulizer at a ratio consistent with the desired end product where the water content is between 1% and 30% with the percentage of the water content remaining constant as the pigment is added to the turbulizer. In some embodiments, the water content of the end product may be about 12% (w/w). In various embodiments, the amount of water added to the mixture may be about 12% (w/w).

In general, the moisture content of the composition may range from 5% to 20% (w/w). In various embodiments, the moisture content by weight in the total composition may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% (w/w). In exemplary embodiments, the moisture content by weight in the total composition may range from about 0.01% to about 25% (w/w).

It is believed that the moisture content of the composition affects the structure of the end product pellet. In this regard, a composition having a high moisture content may lead to a pellet that has a shiny or smooth surface appearance. In contrast, a mixture that has a low water content may lead to a pellet that has a more matte surface appearance. Further, because a moisture may act as a lubricant, a high moisture environment may lead to pellets that do not have a lumpy surface because the developing pellets do not get caught on paddles or pins of a turbulizer or other suitable mixing apparatus. Additionally, moisture may aid in binding. Thus, when the moisture content is high, binding may more readily occur which may cause a smoother surface that does not have many imperfections or lumps. In this regard, the moisture content of the composition should be kept low to aide in the production of imperfections, lumps, indentations, or similar surface structures on the pigment granule produced. When a low moisture composition is introduced to a turbulizer or other suitable mixing apparatus, the low moisture composition will form lumpy particles that have a near polyhedral or irregular polyhedral shape with rounded corners.

Additionally, additives such as dispersants and/or binders may be added to the mixture of pigment and water, dependent on the desired characteristics of the granulated pigment end product. These additional additives may be added to the mixture by sourcing them from an appropriate additive dosing system. As a non-limiting example, a binder may be added to the turbulizer 50 from a first binder dosing system

40 and a second binder dosing system 42 as shown in FIG. 1. In some embodiments, a dispersant may be added to the turbulizer 50 from a first binder dosing system 40 and a second binder dosing system 42. In some embodiments, the mixture may have about 2% binder. The mixture may have about 0.01-10% binder. In some embodiments, the mixture may have about 2% dispersant. The mixture may have about 0.01-10% dispersant. One of skill in the art will appreciate that the additives may be added to the turbulizer using an appropriate dispersant dosing system. Dispersant or binders will affect the properties of the final product and it is recognized that one of skill in the art can vary the recipe dependent on the desired end product. The additives can be in a liquid or solid form. In one embodiment the amount of the additives will be between 0.1% and 10%, in an additional embodiment the additives may be 20% or less. Examples of suitable additives included but are not limited to EDTA, short or medium molecular weight acrylic polymers, short or medium molecular weight modified acrylic polymers, sodium and/or ammonium polyacrylate, TSP, sodium lignosulfonates, calcium lignosulfonates, potassium lignosulfonates, sodium silicates, sodium borates, calcium silicates, calcium borates, potassium silicates, potassium borates, sodium carbonates, calcium carbonates, potassium carbonates, sodium aluminates, calcium aluminates, potassium aluminates, methyl-cellulose and/or hydroxyl-propyl methylcellulose polymers, alkyl sulfonates, aryl-sulfonates or alkyl aryl sulfonates.

In general, the weight percent of additives to the total composition may range from 0% to 13% (w/w). In various embodiments, the weight percent of additives to the total composition may be about 0.05%, about 1%, about 2%, about 3%, about 4%, about 5%, about 6%, about 7%, about 8%, about 9%, about 10%, about 11%, about 12%, or about 13% (w/w). In exemplary embodiments, the weight percent of additives in the total composition may range from about 0.001% to about 10% (w/w).

The method of processing the pigment, water and dispersant/binder/additive mixture is characterized by feeding the pigment mixture or components of the mixture into the cavity of the turbulizer 50 where the pin mill and flexible wall turbulizer arrangement of the pins and the angle of the paddles causes simultaneously the pigment mixture substance to be pelletized while performing the agitating, granulating, and disintegrating, before discharge to a dryer. The method of processing is conducted at a high speed in the horizontal flexible compactor to create the desired pigment granulation. Specifically, the turbulizer machine 50 to be used is generally provided with a cylindrical, conical, or spherical agitating vessel adapted with pins to process the mixture into a substance subjected to granulation. In additional embodiments the agitating means could be in the form of, agitating blades, a blender paddle or other disk shaped attachment disposed within the turbulizer for agitating vessel and adapted to be rotated about a horizontal axis with the incorporation of a flexible compactor attributes that are used to create the granulation. As the turbulizer 50 is operated a spray or injection means, such as a spray or injection device which comprises a liquid storage tank disposed outside the agitating vessel, a liquid pump, a spray gun disposed inside the agitating vessel, and a liquid pipe serving to interconnect the component parts mentioned above is used to add water to the mixture or similar to add liquid dispersants or binders to the mixture.

The turbulizer action on the mixture is at a rate sufficient to create the desired end product of the granulated pigment. In general, the rate of the turbulizer may range from 1500 RPM to 3500 RPM. In various embodiments, the rate of the turbulizer may be about 1750 RPM about 2000 RPM, about 2250 RPM, about 2500 RPM, about 2750 RPM, about 3000 RPM, about 3250 RPM, or about 3500 RPM. One of skill in the art will appreciate that the rate of the turbulizer may by more than 3500 RPM or less than 1500 RPM.

The method for processing the pigment is at a high speed whereby creating the granulation with unique pigment granules that are then ready to be dried to a final moisture content. The pigment granules may be dried using appropriate drying means. In one embodiment the pigment granules have a final moisture content less than 5%. In general, the final moisture content of the pigment granules may range from 0% to 6%. In various embodiments, the final moisture content of the pigment granules may be about 0.001%, about 0.010%, about 0.1%, about 0.15%, about 0.5%, about 1%, about 1.5%, about 2%, about 2.5%, about 3%, about 3.5%, about 4, about 4.5%, about 5%, about 5.5%, or about 6%. In exemplary embodiments, the pigment granules have a final moisture content range from about 0.001% to about 3%. The granulation production creates a near-polyhedral shaped granule with a rounded edge shape that allows for easy incorporation into building materials such as concrete and cementitious materials. The granulation production may also create a granule with the characteristics of an irregular pellet shape that allows for easy transportation and for easy incorporation into building materials such as concrete and cementitious materials. In one embodiment the process and system are carried out with a simultaneous operation enabling the granulating operation by the combination of the pigment with the spray means, and then disintegrating the pigment mixture through the agitating process to produce the pigment granule. It should be noted, however, that all the means mentioned above are not required to be operated continuously throughout the whole process of production. For example, the spray means or the drying means may be intermittently operated when the water content of the substance for granulation must be regulated at a constant level during the whole course of granulation to ensure a paste is not formed but the mixture remains in a powder. Thus, part or all of the steps may be intermittently or discontinuously operated, depending on the state in which the granulation is proceeding at the relevant point of time. The turbulizer or high speed agitated granulating machine of this invention is characterized by being furnished with automatic control means for simultaneously operating the means mentioned to perform agitating and granulating operations simultaneously.

The pigment granules produced through the turbulizer are then discharged into a dryer 60. Examples of dryers that can be used include but are not limited to fluidized beds, rotary, conveyor band, belt, drum or pan dryers. It is envisioned that any type of dryer currently used in the industry can be used to dry the pigment granule. The dryer is used to reduce the final moisture content of the pigment granules to below 5% and preferably below 1%. The pigment granule produced can further be processed to remove any undesirable products that do not have the uniform characteristics desired such as through a filter, cyclone recovery system, or other dust/particle recovery system known in the art. As shown in FIG. 2, the final pigment granule produced will exhibit a near-polyhedral shaped granule with rounded edges that allows for easy transportation including through an auger system and easy incorporation into building materials such as concrete and cementitious materials. The final pigment granule may also have an irregular pellet or a spherical/round shape.

Example 1

In one exemplary example the following process allows for the creation of the pigment granule. The components of 60% to 90% of an amount of a dry iron oxide pigment is added to the turbulizer. Additionally, an amount of water from 10% to 35% is added to create a moist powder or thick slurry. Further an amount of from 0% to 20% of additives are added to the mixture that can include EDTA, short or medium molecular weight acrylic polymers, short or medium molecular weight modified acrylic polymers, sodium and/or ammonium polyacrylate, TSP, sodium lignosulfonates, calcium lignosulfonates, potassium lignosulfonates, sodium silicates, sodium borates, calcium silicates, calcium borates, potassium silicates, potassium borates, sodium carbonates, calcium carbonates, potassium carbonates, sodium aluminates, calcium aluminates, potassium aluminates, methyl-cellulose and/or hydroxyl-propyl methylcellulose polymers, alkyl sulfonates, aryl-sulfonates or alkyl aryl sulfonates. All the desired ingredients are then processed though the turbulizer to create the granulated pigment. The granulated pigment is then further processed through a drying system such as a fluid bed drier until the desired final moisture content is below 5% whereby producing the spherical shaped granulated pigment product.

Example 2

In another exemplary example the following process allows for the creation of the pigment granule. The components of 84% of an amount of pigment is added to the turbulizer. Additionally, an amount of 12% water is added to the turbulizer to create a moist powder or thick slurry. Further an amount of 2% dispersant is added to the turbulizer. Further an amount of 2% binder is added to the turbulizer. All the desired ingredients are then processed though the turbulizer to create the granulated pigment. The granulated pigment is then further processed through a drying system such as a fluid bed drier until the desired final moisture content is below 5% whereby producing the spherical shaped granulated pigment product.

Example 3

In another exemplary example the following process allows for the creation of the pigment granule. The components of 78% of an amount of a dry iron oxide pigment is added to the turbulizer. Additionally, an amount of 12% water is added to create a moist powder or thick slurry. Further an amount of 5% dispersant is added to the mixture. Further an amount of 5% binder is added to the mixture. The binders and dispersants may be any suitable additive that can include EDTA, short or medium molecular weight acrylic polymers, short or medium molecular weight modified acrylic polymers, sodium and/or ammonium polyacrylate, TSP, sodium lignosulfonates, calcium lignosulfonates, potassium lignosulfonates, sodium silicates, sodium borates, calcium silicates, calcium borates, potassium silicates, potassium borates, sodium carbonates, calcium carbonates, potassium carbonates, sodium aluminates, calcium aluminates, potassium aluminates, methyl-cellulose and/or hydroxyl-propyl methylcellulose polymers, alkyl sulfonates, aryl-sulfonates or alkyl aryl sulfonates. All the desired ingredients are then processed though the turbulizer to create the granulated pigment. The granulated pigment is then further processed through a drying system such as a fluid bed drier until the desired final moisture content is below 5% whereby producing the spherical shaped granulated pigment product.

Thus, there has been described an agglomeration system and method for the production of granulated pigments for use in coloring building materials and the resultant granules produced. It is apparent to those skilled in the art, however, that many changes, variations, modifications, other uses, and applications to the screening system and method for using are possible, and also such changes, variations, modifications, other uses, and applications which do not depart from the spirit and scope of the invention are deemed covered by the invention, which is limited only by the claims which follow.

What is claimed is:

1. A method for the production of a pigment granule comprising the steps of adding an amount of a pigment to a granulation machine that includes a horizontal flexible wall compactor, adding an amount of water to the pigment in the granulation machine, to bring the moisture content of the mixture to 12% to 20%, adding an amount of an additive to the granulation machine and activating the granulation machine to produce the pigment granule.

2. The method for producing a pigment granule of claim 1, further including using a drying system to lower the moisture content of the pigment granule to less than 5%.

3. The method for producing a pigment granule of claim 1, further including using a drying system to lower the moisture content of the pigment granule to less than 2%.

4. The method for producing a pigment granule of claim 1, wherein the pigment added is iron oxides, chromium oxides, titanium dioxides, cobalt blues, various other metal-oxides, carbon black, phthalocyanine green, phthalocyanine blue and combinations of the same.

5. The method for producing a pigment granule of claim 1, wherein the additive is a dispersant, a binder or a combination thereof.

6. The method for producing a pigment granule of claim 5, wherein the additive is EDTA, short or medium molecular weight acrylic polymers, short or medium molecular weight modified acrylic polymers, sodium and/or ammonium polyacrylate, TSP, sodium lignosulfonates, calcium lignosulfonates, potassium lignosulfonates, sodium silicates, sodium borates, calcium silicates, calcium borates, potassium silicates, potassium borates, sodium carbonates, calcium carbonates, potassium carbonates, sodium aluminates, calcium aluminates, potassium aluminates, methyl-cellulose and/or hydroxyl-propyl methylcellulose polymers, alkyl sulfonates, aryl-sulfonates or alkyl aryl sulfonates, or combinations thereof.

7. The method for producing a pigment granule of claim 1, wherein the amount of water added to the mixture is an amount sufficient to bring the moisture content of the mixture from 15% to 20%.

8. The method for producing a pigment granule of claim 1, wherein the produced pigment granule has a size passing 40 mesh.

9. The method for producing a pigment granule of claim 1, wherein the produced pigment granule has a size passing 200 mesh.

10. The method for producing a pigment granule of claim 1, further including using a drying system to lower the moisture content of the pigment granule to less than 1%.

11. The method for producing a pigment granule of claim 1, wherein the produced pigment granule comprises a virgin pigment.

12. The method for producing a pigment granule of claim 1, wherein the produced pigment granule has a spherical shape.

13. The method for producing a pigment granule of claim 1, wherein the produced pigment granule has a near-polyhedral or irregular polyhedral shape with rounded edges.

14. A method for the production of a pigment granule comprising the steps of adding an amount of a virgin pigment and an amount of a recycled pigment to the granulation machine that includes a horizontal flexible wall compactor;
   wherein the recycled or virgin pigment added is iron oxides, chromium oxides, titanium dioxides, cobalt blues, various other metal-oxides, carbon black, phthalocyanine green, phthalocyanine blue and combinations of the same; wherein the amount of virgin pigment is about 40-100% (w/w), wherein the amount of recycled pigment is about 40-100% (w/w);
   adding an amount of water to the pigment in the granulation machine, wherein the amount of water is sufficient to bring the moisture content of the mixture from 12% to 20%;
   adding an amount of an additive to the granulation machine and activating the granulation machine to produce the pigment granule; wherein the additive is a dispersant, a binder or a combination thereof, and wherein the additive is EDTA, short or medium molecular weight acrylic polymers, short or medium molecular weight modified acrylic polymers, sodium and/or ammonium polyacrylate, TSP, sodium lignosulfonates, calcium lignosulfonates, potassium lignosulfonates, sodium silicates, sodium borates, calcium silicates, calcium borates, potassium silicates, potassium borates, sodium carbonates, calcium carbonates, potassium carbonates, sodium aluminates, calcium aluminates, potassium aluminates, methyl-cellulose and/or hydroxyl-propyl methylcellulose polymers, alkyl sulfonates, aryl-sulfonates or alkyl aryl sulfonates, or combinations thereof, wherein the amount of additive is about 0.01 to about 10% (w/w); and
   using a drying system to lower the moisture content of the pigment granule to less than 2%.

15. The method for producing a pigment granule of claim 14, wherein the produced pigment granule has a spherical shape.

16. The method for producing a pigment granule of claim 14, wherein the produced pigment granule has a near-polyhedral or irregular polyhedral shape with rounded edges.

17. The method for producing a pigment granule of claim 14, wherein the produced pigment granule has a size passing 40 mesh.

18. The method for producing a pigment granule of claim 14, wherein the produced pigment granule has a size passing 200 mesh.

* * * * *